United States Patent
Coventry

(10) Patent No.: US 10,393,094 B2
(45) Date of Patent: *Aug. 27, 2019

(54) VAPOUR ONLY CYCLING OF HEAT TRANSFER FLUID FOR THE THERMAL STORAGE OF SOLAR ENERGY

(71) Applicant: SUNRISE CSP PTY LIMITED, Lyneham (AU)

(72) Inventor: Joseph Sydney Coventry, Watson (AU)

(73) Assignee: SUNRISE CSP PTY LIMITED (AU)

( * ) Notice: Subject to any disclaimer, the term of this patent is extended or adjusted under 35 U.S.C. 154(b) by 115 days.

This patent is subject to a terminal disclaimer.

(21) Appl. No.: 15/161,341

(22) Filed: May 23, 2016

(65) Prior Publication Data

US 2017/0016650 A1  Jan. 19, 2017

Related U.S. Application Data

(63) Continuation-in-part of application No. 13/381,102, filed on Dec. 28, 2011, now Pat. No. 9,347,713.

(51) Int. Cl.

| | |
|---|---|
| *F03G 6/06* | (2006.01) |
| *F24S 60/00* | (2018.01) |
| *F28D 20/00* | (2006.01) |
| *F24S 90/00* | (2018.01) |
| *F03G 6/00* | (2006.01) |

(52) U.S. Cl.
CPC ............. *F03G 6/067* (2013.01); *F03G 6/005* (2013.01); *F24S 60/00* (2018.05); *F24S 90/00* (2018.05); *F28D 20/00* (2013.01); *F28D 2020/0047* (2013.01); *Y02E 10/46* (2013.01); *Y02E 60/142* (2013.01); *Y02E 70/30* (2013.01)

(58) Field of Classification Search
CPC ....... F03G 6/00; F03G 6/003–068; F24J 2/42; F24J 2/34; F24J 2/345; F24J 2/30; Y02E 10/40–46; F22B 1/006; F28D 2020/006–0078; F28D 20/00; F01K 3/00; F01K 3/006; F01K 3/12; F01K 3/14; F01K 3/16; F02C 1/05; F02C 6/14
See application file for complete search history.

(56) References Cited

U.S. PATENT DOCUMENTS

| | | |
|---|---|---|
| 4,171,617 A | 10/1979 | Sakamoto et al. |
| 4,192,144 A | 3/1980 | Pierce |
| 4,211,207 A | 7/1980 | Molivadas |
| 4,212,287 A | 7/1980 | Dougherty et al. |
| 4,215,553 A | 8/1980 | Poirier et al. |
| 4,222,365 A | 9/1980 | Thomson |
| 4,248,049 A | 2/1981 | Briley |

(Continued)

FOREIGN PATENT DOCUMENTS

| | | | |
|---|---|---|---|
| CN | 101413719 A | 4/2009 | |
| WO | WO 2012168251 A1 * | 12/2012 | ............... F01K 3/12 |

*Primary Examiner* — Mark A Laurenzi
*Assistant Examiner* — Xiaoting Hu
(74) *Attorney, Agent, or Firm* — Galbreath Law Offices, P.C.; John A. Galbreath

(57) ABSTRACT

Heat transfer fluid in vapor only state is cycled through solar collector(s) (12) and a sensible heat storage medium (14) to transfer heat from the solar collector(s) (12) to the sensible heat storage medium (14). The heat transfer fluid is a liquid at ambient temperature, but substantially in the vapor state throughout the entire cycle when in operation.

32 Claims, 4 Drawing Sheets

(56) References Cited

U.S. PATENT DOCUMENTS

| | | | |
|---|---|---|---|
| 4,265,223 | A | 5/1981 | Miserlis et al. |
| 4,273,102 | A | 6/1981 | Anthony |
| 4,276,872 | A | 7/1981 | Blake et al. |
| 4,278,073 | A * | 7/1981 | Canzano .............. F24J 2/42 126/636 |
| 4,339,930 | A | 7/1982 | Kirts |
| 4,358,929 | A | 11/1982 | Molivadas |
| 4,400,946 | A | 8/1983 | Oplatka |
| 4,438,758 | A | 3/1984 | Brekke |
| 5,269,145 | A * | 12/1993 | Krause .............. C09K 5/063 126/618 |
| 5,806,317 | A | 9/1998 | Kohler et al. |
| 2002/0162330 | A1 * | 11/2002 | Shimizu .............. F01K 25/06 60/651 |
| 2003/0074901 | A1 * | 4/2003 | Bellac .............. F01K 21/047 60/772 |
| 2004/0035111 | A1 | 2/2004 | Ven et al. |
| 2008/0184789 | A1 | 8/2008 | Eck et al. |
| 2008/0276616 | A1 * | 11/2008 | Flynn .............. F01K 3/12 60/641.15 |
| 2009/0125152 | A1 | 5/2009 | Skowronski et al. |
| 2009/0261591 | A1 * | 10/2009 | Palkes .............. F03G 6/003 290/52 |
| 2010/0176602 | A1 | 7/2010 | Shinnar |
| 2010/0295306 | A1 * | 11/2010 | Ridnik .............. F03G 6/005 290/52 |
| 2013/0285380 | A1 * | 10/2013 | Afremov .............. F24J 2/07 290/52 |

* cited by examiner

VAPOUR ONLY CYCLING OF HEAT TRANSFER FLUID FOR THE THERMAL STORAGE OF SOLAR ENERGY

FIELD OF INVENTION

This invention relates to solar power stations and more particularly to solar power stations that use water as the heat transfer fluid in combination with a sensible heat storage medium.

BACKGROUND

Solar power stations that use a sensible heat storage medium, typically a molten salt, have been proposed to store captured solar energy. The sensible heat storage medium can then be used for steam generation to drive conventional steam turbine generator systems.

It is advantageous to store energy at higher temperatures because it minimises the mass of the storage medium for a sensible energy storage medium, and allows energy recovery from storage at higher temperature, which leads to higher conversion efficiencies in the power generation cycle.

Energy is transferred from the solar collector to the sensible energy storage medium by a heat transfer fluid. Synthetic oils have been proposed as a heat transfer fluid but these are typically only stable to about 400° C., limiting the maximum temperature of the sensible heat storage medium. Typically oil is used as the heat transfer medium for solar trough plants, including plants with molten salt thermal storage. However solar troughs are limited in the upper temperature they can operate at with acceptable efficiency, as they track the sun on a single axis and therefore have a lower solar concentration ratio than two axis tracking solar collectors, such as dishes. The use of oil for a solar trough plant does restrict the upper temperature they might otherwise operate, from say 450° C. to around 400° C.

Solar dish and tower technologies have the capacity to reach far higher temperatures, in excess of 600° C., which has the advantages previously mentioned of minimising the mass of the storage medium and facilitating higher conversion efficiencies in the power generation cycle. Unfortunately, there is no fluid that remains in liquid state at both such high temperature and at ambient temperature (with the exception of Sodium-Potassium alloy (NaK) which is considered too dangerous for a solar pipe network as it is highly reactive with water and may explode when in contact with water or air).

Typically solar tower technologies, which have a fixed solar receiver, directly heat molten salt at the focal point which is located in close proximity to the storage vessels. Reticulation of the salt, which acts as both the energy storage medium and heat transfer fluid, is relatively simple, and gravity drain back ensures the salt is emptied from the pipework during the night or extended cloudy periods and hence cannot freeze in the pipes or receiver. For solar dish technologies, the direct heating solution is problematic as each dish has its own focal point and dishes may be distributed over a very large area. Emptying the pipes may be impractical or unfeasible. Salt mixtures used for thermal storage are solid at ambient temperatures, hence a distributed solar field using salt as both the heat transfer fluid and the storage medium would be required to be heated at all times, day and night. Any flaw in the heating system would result in freezing of salt in the pipe network.

Water can be used as a heat transfer fluid. When using water as the heat transfer fluid over a high temperature range there is typically a phase change at practical working pressures. As the water is cooled and changes phase from superheated steam to liquid water there is a well known "pinch point" problem with transferring energy from steam to a single sensible heat storage medium. This "pinch point" problem significantly limits the upper temperature of the heat storage even when high temperature steam is available.

For heat to be transferred from the water (whether vapour or liquid) to the storage medium, the water must be at a higher temperature than the storage medium at all points along the heat exchanger. When condensing vapour to liquid the temperature remains the same (at constant pressure) between 100% vapour and 100% liquid. This causes a pinch point at the 100% vapour point which limits the maximum temperature that can be attained in the storage medium. The pinch point problem is illustrated in a temperature-enthalpy diagram in FIG. 1, which shows the enthalpy of water 2 at 165 bar from 300° C. to 600° C. and the enthalpy of a sensible heat storage medium 4 heated by the water. Despite the high inlet steam temperature in this example, a maximum temperature of the storage medium is limited by the 'pinch' to about 380° C.

It has been proposed to separate the steam flow into three sections: pure liquid, 2-phase liquid and vapour, and pure vapour. In that method, three separate heat storage mediums are required. There is sensible heat storage for both liquid and vapour phases, and a phase change material (such as an appropriate salt) for the 2-phase region. Whilst this avoids the pinch point problem it would result in a relatively complex energy storage system.

Solar power plants that use solar dishes convert sunlight to electricity at almost twice the efficiency of other technologies (tower or trough) due to the combination of high temperature capability and high optical efficiency. However, power generation with solar dishes when combined with molten salt storage is problematic when using heat transfer fluids in the conventional way for the reasons aforementioned.

SUMMARY OF THE INVENTION

The present invention provides an energy source such as a solar power station that cycles heat transfer fluid, preferably water, in only vapour state when transferring energy to a sensible heat storage. The cycling of water in entirely vapour (superheated) state avoids the pinch point problem, and the problems associated with other fluid types of high temperature stability and solid phases at ambient temperature, as previously described.

In the preferred form of the invention there is provided sensible heat storage for storage of heat. The sensible heat storage preferably utilises a single sensible heat storage medium, typically a mixture of one or more compounds. However, it is within the scope of the invention for two or more different mediums to be used, each of which comprises a separate discrete part of the sensible heat storage and which may exchange heat with the heat transfer fluid through separate heat exchange subsystems. For example "high" and "low" temperature sensible heat storage mediums may be used to extend the temperature range of the heat transfer fluid between entering and leaving the heat exchange system. Different mediums may be different compounds, different mixtures of compounds or mixtures of different compounds. As used in the description and claims the term "sensible heat storage" is to be interpreted in a non limiting manner and may include two or more different sensible heat storage mediums.

When transferring heat from the solar collectors of the power station to the sensible heat storage, superheated vapour at a high temperature enters the heat exchanger system and lower temperature vapour that is above, at or below but near the saturation curve exits the heat exchanger mechanism for return to the solar collectors.

The invention also provides a solar power station having:
 a sensible heat storage;
 at least one solar collector;
 a heat transfer fluid that is a liquid at ambient temperature;
 a heat exchanger for transfer of heat from the heat transfer fluid to the sensible heat storage,
 the station having a first mode of operation in which heat is transferred from the heat transfer fluid to the sensible heat storage and heat transfer fluid substantially in the vapour state is returned to the at least one solar collector.

Preferably the power station includes means to limit, prevent or cease heat exchange from the heat transfer fluid to the sensible heat storage when the temperature and pressure of the heat transfer fluid at a first location is below a first set of thresholds.

The first location is preferably downstream of the at least one solar collector.

Transfer of heat from the heat transfer fluid to the sensible heat storage may be limited, prevented or ceased by ceasing flow of one or both of the heat transfer fluid and the sensible heat storage medium(s) (when a fluid) through a heat exchanger system.

When one or more fluid sensible heat storage mediums are pumped through a heat exchanger system this may be achieved by ceasing to pump the fluid sensible heat storage medium(s). The heat transfer fluid may continue to pass through the heat exchanger or may be caused to bypass the heat exchanger.

Preferably the heat transfer fluid is still superheated immediately after heat exchange with the sensible heat storage. However the heat transfer fluid may be cooled to the saturation curve or just below but near the saturation curve. When transfer of heat from the heat transfer fluid to the sensible heat storage is occurring preferably heat transfer fluid remains substantially in the vapour state throughout the cycle.

Most preferably the heat transfer fluid remains superheated between leaving the heat exchanger and returning to the at least one solar collector. One or more compressors preferably circulate the vapour when in the first operational mode.

The solar power station preferably has heater means that selectively heats the heat transfer fluid when the heat transfer fluid is below the first set of thresholds. The heater means may be one or more solar collectors that heat the heat transfer fluid to above the first set of thresholds. During the heating stage, preferably transfer of heat from the heat transfer fluid to the sensible heat storage does not occur.

Preferably the means to prevent heat exchange includes circulating means to return the heat transfer fluid to the inlet of at least one solar collector when the heat transfer fluid is below the first set of thresholds.

Preferably the power station includes a pump subsystem that is operable to pump vapour or liquid heat transfer fluid through the at least one solar collector.

Preferably the pump subsystem includes a device for separating a mixture of the liquid and vapour phases, commonly referred to as a steam separator when used with water.

As used in this specification the term "steam separator" is not to be taken as requiring use of water as the heat transfer fluid.

Preferably the pump subsystem is operable to pump vaporous heat transfer fluid through at least one solar collector when temperature and pressure conditions are above a second set of thresholds and liquid heat transfer fluid when temperature and pressure conditions are below the second set of thresholds.

In the preferred form of the invention water is used as a heat transfer fluid and the pump subsystem includes a steam separator, a vapour compressor and a liquid pump. Above the first set of thresholds superheated steam is circulated from solar collectors to a sensible heat storage medium by the compressor. Between the first and a second set of thresholds the heat transfer fluid is heated, preferably by the compressor circulating vapour through at least one solar collector and back to the steam separator but heat transfer from the heat transfer fluid to the sensible heat storage does not occur. In the preferred form this is achieved by merely ceasing to pump sensible heat storage medium through the heat exchanger system and the heat transfer fluid passes from the at least one solar collector, through the heat exchanger system and then back to the solar collector(s), preferably via the steam separator. The system may cause the heat transfer fluid to bypass the heat exchanger system.

Below the second set of thresholds the heat transfer fluid is heated, preferably by the liquid pump pumping liquid water to at least one solar collector and back to the steam separator but heat transfer from the heat transfer fluid to the sensible heat storage does not occur. In the preferred form this is achieved by merely ceasing to pump sensible heat storage through the heat exchanger and the heat transfer fluid passes from the at least one solar collector, through the heat exchanger system and then to the steam separator. The system may cause the heat transfer fluid to bypass the heat exchanger system. To prevent two-phase flow through the collectors preferably only one of the compressor and pump is used at any one time and preferably both are not used simultaneously.

The system may be configured to bypass the steam separator during normal operation.

In systems that cause the heat transfer fluid to bypass the heat exchanger system the steam separator preferably has a first inlet that receives diverted heat transfer fluid and a second inlet that receives heat transfer fluid that has been cooled by heat transfer to the sensible heat storage. In systems without a bypass mode a single inlet is sufficient.

The at least one solar collector may comprise a sub set of a plurality of solar collectors.

When the heat transfer fluid is below either or both the first and second sets of thresholds it need not be circulated through all solar collectors.

The invention also provides a method of operation of a solar power station having a sensible heat storage selectively heated by a heat transfer fluid heated by at least one solar collector, the method including:
 determining the temperature and pressure of heat transfer fluid at a first location and if the temperature and pressure of the heat transfer fluid is:
 (a) above a first set of thresholds, causing the heat transfer fluid to heat the sensible heat storage,
 or
 (b) below the first set of thresholds, heating the heat transfer fluid whilst preventing heat transfer to the sensible heat storage.

Preferably the first location is downstream of the at least one solar collector, i.e. after heating.

Preferably the first set of thresholds is selected so that the heat transfer fluid is a vapour both before and after transfer of heat to the sensible heat storage.

The step (a) may include providing or opening a flow path between the outlet of the solar collector and a heat exchanger system.

Preferably step (b) includes heating the heat transfer fluid by passing the heat transfer fluid through at least one solar collector.

When fluid sensible heat storage medium is used that is pumped through the heat exchanger system step (b) may include ceasing to pump fluid sensible heat storage medium through the heat exchanger system. The heat transfer fluid may continue to pass through the heat exchanger system.

Step (b) may include removing or closing a flow path between the solar collector and a heat exchanger system. Step (b) may also include providing or opening a flow path between the outlet of the solar collector and a pumping subsystem that pumps heat transfer fluid to the at least one solar collector so as to bypass the heat exchanger system.

When below the first threshold the method also includes determining the temperature and pressure of heat transfer fluid at a second location and:
(c) if the temperature and pressure of heat transfer fluid is above a second set of thresholds, causing the heat transfer fluid in substantially only vapour form to be supplied to the at least one solar collector,
and
(d) if the temperature and pressure of heat transfer fluid is below the second set of thresholds but above a third set of thresholds, causing the heat transfer fluid in liquid form to be supplied to the at least one solar collector.

Preferably the heat transfer fluid in either only substantially vapour form or only substantially liquid form is supplied to the at least one solar collector. Thus, preferably step (d) results in supply of only substantially liquid heat transfer fluid.

The first and second locations may be the same or different.

The method also includes not supplying the heat transfer fluid to the at least one solar collector if the temperature and pressure of heat transfer fluid is below the third threshold.

Other parameters may be used to determine the mode of operation, such as time of day and solar radiation intensity at one or more locations.

The method preferably includes providing a steam separator and step (c) includes drawing vapour from the steam separator and step (d) includes drawing liquid from the steam separator.

The quantity of heat transfer fluid being circulated is preferably adjusted to maintain the heat transfer fluid above certain thresholds, depending on the quantity of input energy (i.e. solar radiation) available.

Unless the context clearly requires otherwise, throughout the description and the claims the words 'comprise', 'comprising', and the like are to be construed in an inclusive sense as opposed to an exclusive or exhaustive sense; that is to say, in the sense of "including, but not limited to".

DETAILED DESCRIPTION OF PREFERRED AND OTHER EMBODIMENTS

Figure 2:
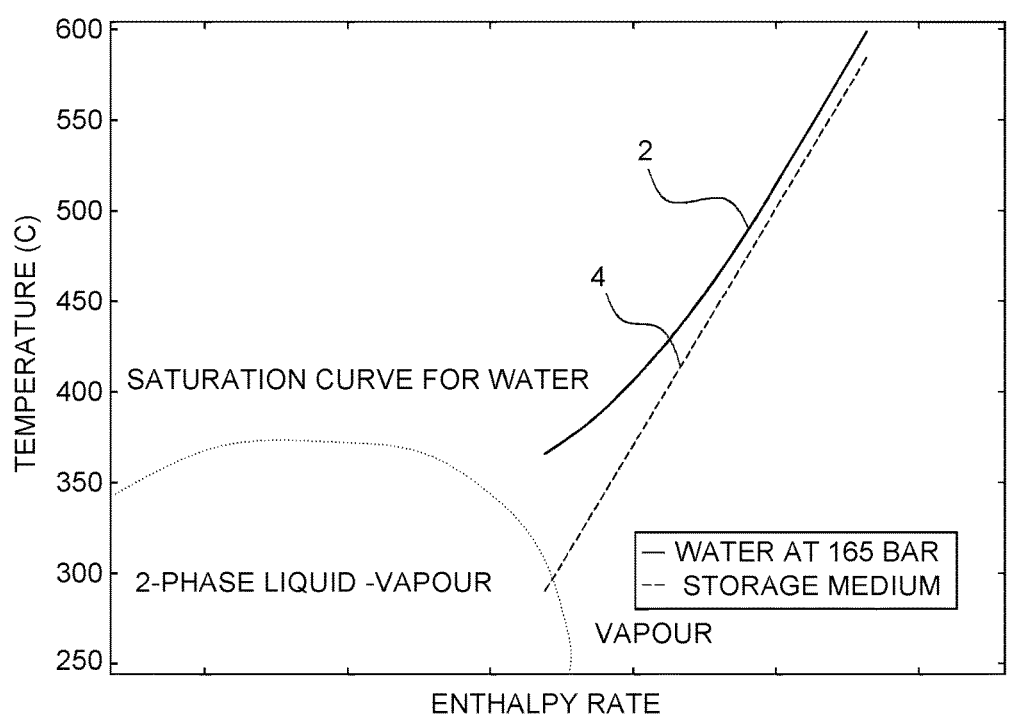
FIG. 2 is a temperature—enthalpy diagram of heat transfer fluid and sensible heat storage medium of the solar power station according to an example of the invention.
Figure 3:
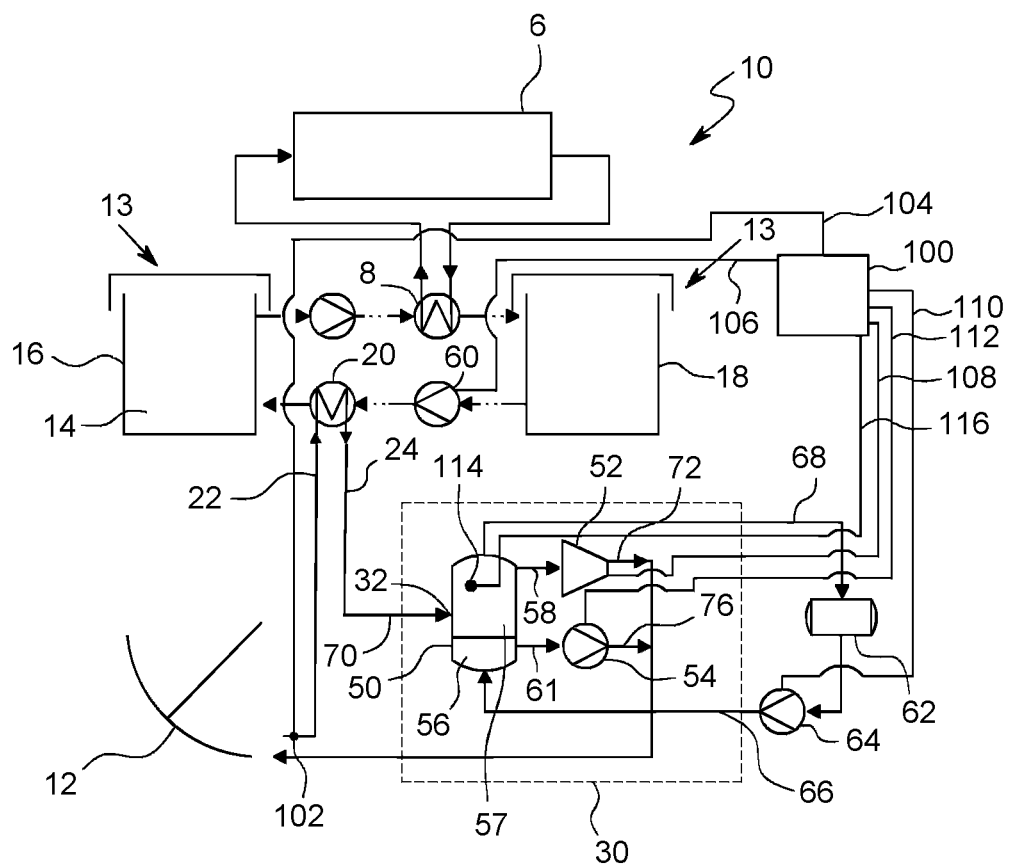
FIG. 3 is a schematic of a solar power station according to a first example of the invention.

Referring to FIGS. 2 and 3 there is shown a solar power station 10 according to a first example of the invention. The solar system 10 has one or more solar collectors, solar collector arrays or solar collector field(s), schematically represented by solar collector 12. Whilst the solar collector 12 shown is a parabolic dish type collector the invention is not limited to such collectors. The collection system may utilise trough type collectors, be a tower type collector field in which multiple mirrors focus sunlight on a common collection point or any other suitable collection system. The exact nature of the solar collector system is not critical to the invention.

The solar power station utilises water ($H_2O$) as a heat transfer fluid to transfer heat collected from sunlight by the collectors 12 to a sensible heat storage, generally indicated by numeral 13. The sensible heat storage 13 utilises a sensible heat storage medium 14. The heat storage medium 14 stores heat and is used to supply heat on demand.

In the preferred form of the invention the sensible heat storage 13 has at least one pair of tanks 16, 18 for storage of the sensible heat storage medium 14, which is preferably a fluid, preferably a liquid, at the range of operating temperatures. The tanks 16, 18 are "hot" and "cold" tanks, but this is relative. A single tank with a thermocline could be used. Solid materials may be used as a heat storage medium but are not preferred. The system only uses one type of heat storage medium and there is no need for two or more different types (such as latent heat storage medium as well as sensible heat storage medium), but the use of different types of sensible heat storage medium is not excluded.

In the preferred embodiment the heat stored in the heat storage 13 is used to generate steam for an electrical generator system. Accordingly, the system 10 includes one or more conventional power blocks 6, each of which includes at least one steam turbine generator set. Steam is generated for the power blocks 6 by exchanging heat with the sensible heat storage medium 14. Hot liquid is pumped from the 'hot' tank 16 to the 'cold' tank 18 via a heat exchange system 8, where water is heated to steam. The heat exchange system 8 may include one or more separate heat exchangers.

The system is not limited to electrical generation and may be used for other applications requiring a heat source.

Mixtures of salts are preferred for sensible energy storage in combination as they are liquid within the range of above ambient working temperatures, which allows for both good heat transfer to water and for generation of steam at suitable temperatures and pressures to achieve high thermal-to-electrical energy conversion efficiencies. In addition salt mixtures are dense, have low chemical reactivity, have low vapour pressure and relatively low cost.

The most common salt mixture used for energy storage is a nitrate salt mixture of 60% by weight sodium nitrate and 40% by weight potassium nitrate. This salt can be used over a temperature range of approximately 260° C. to 620° C. Other salts are also feasible for energy storage, such as the nitrite salts and carbonate salts, and have different upper and lower operational temperature limits.

During normal operation, with conditions that provide above threshold output from the collectors 12, water in the form of superheated steam leaves the collectors 12 travels along pipe 40 and enters heat exchange system 20 at 22. The heat exchange system 20 may include one or more separate heat exchangers. Heat is transferred to heat storage medium 14 pumped through the heat exchange system 20 from the cold tank 18 to the hot tank 16 by pump 60. The water preferably remains as "dry" vapour through the heat exchange system 20 and exits at 24 at a temperature above the saturation temperature for the pressure in the system. For example, at an absolute pressure of 165 bar the saturation temperature is about 350° C. By using only the vapour state, superheated steam entering the heat exchanger at about 600° C. may be cooled to about 370° C. (providing some allowance for variability) whilst heating the sensible heat storage medium from about 290° C. to about 590° C., giving a temperature difference between the hot and cold tanks of about 300° C.

Figure 1:
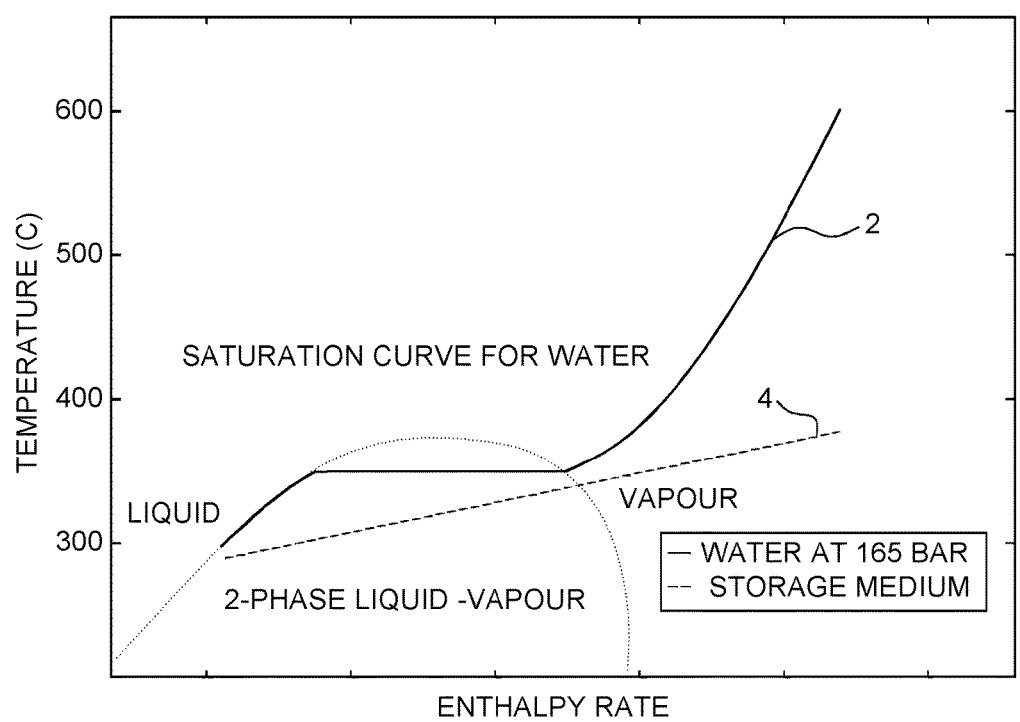
FIG. 1 is a temperature—enthalpy diagram of water and a sensible heat storage medium when cooling superheated steam to liquid water.

In contrast, referring to FIG. 1, using water at 165 bar that is heated to 600° C. and then condensed to liquid water only allows a single sensible heat storage to be heated to about 380° C. In such a system the lower temperature of the heat storage medium is about 290° C., giving a temperature difference between hot and cold tanks of less than 100° C.

Whilst a system that maintains the heat transfer fluid in a superheated state is possible in a steady state or near steady state situation, solar energy is an intermittent energy source and a system designed to use superheated steam must also be designed to cope with conditions where generation of superheated steam is not possible. For example, at the start of the day, the system may be at ambient temperature. Similarly, transient solar conditions due to clouds will mean 'design' conditions for the superheated steam cannot always be met.

In a system having a simple compressor for pumping superheated steam, if the water cannot be maintained above the saturation temperature the vapour starts to condense. This in turn reduces the pressure. Feeding wet steam to a compressor can cause damage. In addition at low temperatures when substantially all of the water in the system is liquid the vapour pressure is very low.

In addition, at an intermediate "warm" state, when the system is at the saturation temperature of the water, two phase conditions can occur within the pipe work. Two phase conditions are neither desirable in the compressor nor desirable in reticulating heat transfer fluid to the collectors. It is better to have either vapour flow or liquid flow in a pipe but not both vapour and liquid.

The present invention provides a "heating" mode, preferably a two stage heating mode, that is activated whenever design condition temperatures (and pressures) are not possible. In the "heating" mode the heat collected by the solar collectors is not transferred to the sensible heat storage medium but is used to maintain and preferably increase the enthalpy of the heat transfer fluid. This is achieved by providing a pumping subsystem 30 that preferably pumps either water or vapour as conditions require through the solar collectors but not transferring the collected heat to the sensible heat storage medium.

In the example of FIG. 3 this is achieved by merely turning the pump 60 off, so that heat transfer fluid passing through the heat exchange system 20 cannot transfer any significant amount of heat to the sensible heat storage medium. It will be appreciated that any sensible heat storage medium remaining in the heat exchange system 20 may be heated but this is insignificant. Of course with a drain back heat exchange system 20 there will be no sensible heat storage medium remaining in the heat exchange system 20. The heat transfer fluid passes through the heat exchange system 20 and passes along pipe 70 enters the pumping subsystem 30 via an inlet 32.

The pumping subsystem 30 includes a steam separator 50, a compressor 52, and a liquid pump 54. In a steam separator wet steam is separated into liquid and vapour phases. The steam separator 50 includes a space for liquid water 56 and a vapour space 57.

The system includes control system 100 that receives temperature and pressure inputs from the solar collector outlet(s) via sensors 102 via signal line 104. The control system 100 controls pump 60, vapour compressor 52, liquid pump 54 and liquid pump 64 via control lines schematically indicated by lines 106, 108 110 and 112. The control system also receives data relating to the conditions in the steam separator, such as the temperature and pressure of the vapour, from sensor(s) 114 via signal line 116.

During normal operations heat transfer fluid from the heat exchanger 20 enters the steam separator via inlet 32. If the steam is wet any liquid is separated and collected in the space 56 and substantially only vapour is passed to the compressor 52 via vapour outlet 58. Vapour compressor 52 returns compressed vapour to the solar collector(s) 12 via pipes 72 and 74 The steam separator 50 may be bypassed via a line (not shown) if the steam is still superheated at that point. In practice during normal operation the steam entering the steam separator 50 will still be superheated. The system includes a condensate tank 62 that is used to modulate the amount of fluid circulating, as discussed later. This allows the heat transfer fluid to pass through the steam separator above the saturation temperature under a range of different energy input (solar) levels.

Assume solar intensity reduces a little due to the position of the sun or light cloud. The temperature (sensed by sensors 102) of the steam leaving all or some of the collectors 12 will drop. This can be compensated for by varying mass flow through the solar collectors. When superheated steam is supplied to the solar collectors this is by the control system 100 controlling the compressor 52. Similarly the amount the steam is cooled as it passes through the heat exchange system 20 can be varied by varying mass flow of the heat storage medium through the heat exchange system 20 by the control system 100 controlling the pump 60.

However, at a certain threshold the temperature and pressure combination of steam leaving the solar collectors (sensed by sensors 102) may result in condensing of water in the heat exchanger 20. It is within the scope of the invention for the heat transfer fluid to be at or just below the saturation curve (i.e. partially condensed) as it leaves the heat exchange system 20. This is because in normal operation the temperature of the cold sensible heat storage medium entering the heat exchanger system is sufficiently below the saturation curve temperatures that heat transfer can still occur without the pinch point problem occurring. However, the system switches to a first heating mode when the temperature and pressure combination (sensed by sensors 102) falls below a first threshold. In this first heating mode the pump 60 is turned off by the control system 100 and steam passes into the steam separator inlet 32 substantially uncooled. With lower temperatures and pressures some vapour may condense to reach equilibrium. Any liquid in the steam is separated and accumulates in the reservoir 56.

The compressor 52 continues to run and the liquid pump 54 is inactive. Vapour continues to circulate through the solar collectors 12.

Assume a cloud has passed over only part of the collector field. The collectors will still collect some energy and the vapour temperature et pressure will remain sufficiently high to allow continued vapour circulation. Once the cloud has passed, the energy collected increases. The temperature of the steam leaving the collectors 12 increases. As the energy in the system increases more liquid in the reservoir will convert to vapour.

The steam continues to pass through the heat exchanger system 20 uncooled until the temperature and pressure of the steam leaving the solar collectors 12 (as sensed by sensors 102) reaches a threshold, at which point the pump 60 is restarted by the control system 100 and "normal" operation recommences.

If the temperature and pressure of the steam leaving the solar collectors 12 (as sensed by sensors 102) is below a second threshold the system runs in a second heating mode. This mode is typically at the start of the day when there is some solar energy to be collected but not enough to allow heating of the sensible heat storage medium or to supply vapour to the solar collectors. However, this mode may occur during the day if heavy cloud passes over the field and the temperature falls below the second threshold. In this second heating mode control system 100 has the pump 60 off so there is no heat transfer from the heat transfer fluid to the sensible heat storage medium. The compressor 52 is preferably turned off by control system 100 and the liquid pump 54 is turned on by the control system 100 to pump liquid water from the steam separator via outlet 61 to the solar collectors 12 via pipes 76 and 74. There may be circumstances where both the compressor 52 and pump 54 operate (for a short period of time) during switchover between the two modes.

The condensate tank 62 is used to modulate the amount of heat transfer fluid circulating to maintain the system within operating parameters and to enable initial operation.

As energy input varies the amount of fluid circulating may be adjusted by adding or removing fluid from the steam separator 50.

At start up a greater mass of fluid is required to fill the volume of the pipes to one or more dishes to enable pumping of the fluid. The control system 100 may cause Additional liquid to be pumped from the condensate tank 62 by pump 64 to the steam separator 50 via pipework 66 by turning on pump 64.

As energy is added more of the heat transfer fluid evaporates and so the pressure in the system increases. Once the pressure in the system reaches a threshold steam is bled from the steam separator 50 to the condensate tank 62, via pipework 68, where it is condensed, so reducing the mass circulating. This continues until all the heat transfer fluid is vapour. Heat transfer fluid removal may occur after all fluid is vapour as the energy in the system increases to limit the operating conditions, such as the operating pressure. Suitable valves (not shown) allow the condensate tank 62 to be isolated from the steam separator.

The pump 64 and associated pipework 66 and 68 and valves (not shown) may be considered to be a transfer mechanism for selectively transferring heat transfer fluid between the solar collector circuit and the condensate tank 62.

The pump subsystem 30 is turned off totally when there is no benefit in keeping it running, such as at night time or at low solar radiation intensities. Due to energy requirements for pumping, at low solar radiation intensities there may be a net energy loss. The control system 100 may measure solar radiation intensity and other parameters and use these in determining whether to pump or not.

Liquid water is pumped to the collectors 12 and heated by the collectors. The water returns to the steam separator and heats the liquid water in the reservoir 56. As the temperature of the liquid increases, so does its vapour pressure. The liquid water continues to be circulated. At the beginning of the day as the sun rises the solar energy intensity increases. The temperature and pressure of the system increases until the vapour pressure (sensed by sensor 114) in the separator is above a threshold. At that threshold the control system 100 switches to the first heating mode, compressor 52 starts and the pump 54 stops. The pump 60 remains off. Vapour is then circulated until 'design' temperature is reached to allow normal operation as described above in which heat transfer from superheated steam to the sensible heat energy storage medium re-commences by turning on pump 60.

Thus the system has the relative simplicity of using a single sensible heat storage compound whilst providing the high storage temperature provided by use of multiple heat storage compounds.

Whilst the system may pass heat transfer fluid through all solar collectors 12 of an array when in the heating modes, this is not essential. It may be preferred that the system only pass heat transfer fluid through a small number of the collectors when in either of the heating modes.

Figure 4:
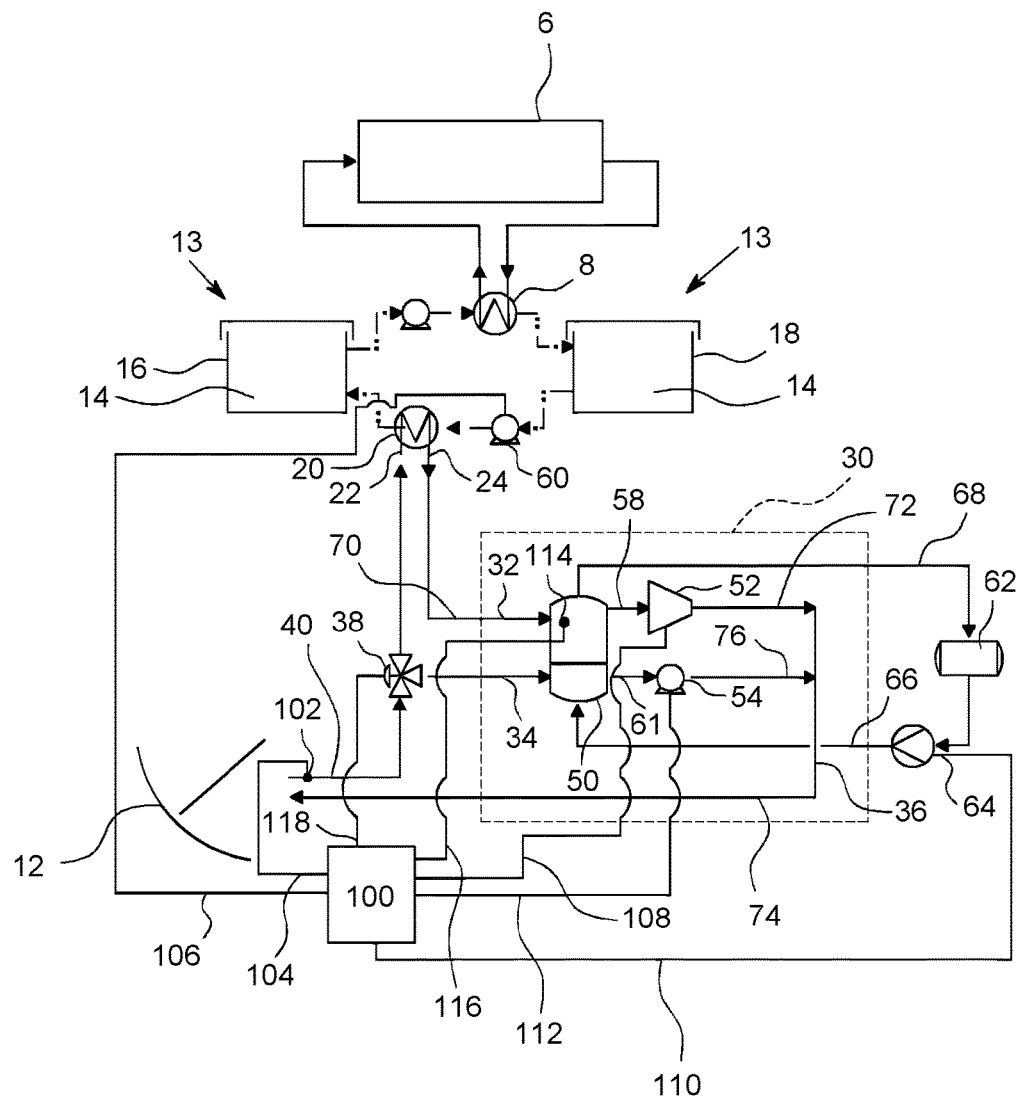
FIG. 4 is a schematic of a solar power station according to a second example of the invention.

FIG. 4 schematically shows a second example of the invention. Similar parts utilise the same numbers as for the first example. This example operates with the three different modes as the first example but during heating modes bypasses the heat exchange system to prevent transfer of heat from the heat transfer fluid to the sensible heat storage.

The pumping subsystem 30 has two inlets 32 and 34 and a single outlet 36. Inlet 32 is connected to the outlet of the heat exchanger 20 whilst inlet 34 is connected via a three way valve 38 (or another suitable combination of valves) to the solar collector outlet/heat exchanger inlet pipe 40. Outlet 36 feeds to the inlet pipe 42 of the solar collectors. Three way valve 38 is controlled by control system 100 via control line 118.

In normal mode the control system 100 sets valve 38 to pass superheated steam from the solar collectors to the heat exchanger system 20 and the inlet 34 to the pumping subsystem 30 is closed.

In the heating modes the control system 100 changes valve 38 to divert heat transfer fluid exiting the solar collector 12 to the inlet 34 of the pumping subsystem 30 and thus heat transfer fluid does not flow through the heat exchange system 20. The same thresholds as described before are used to determine if the liquid pump 54 or the compressor 52 runs. The opening and closing of the valve 38 corresponds to the turning on and off of the pump 60.

It will be apparent to those skilled in the art that many obvious modifications and variations may be made to the embodiments described herein without departing from the spirit or scope of the invention.

The invention claimed is:

1. A solar power station having:
   a sensible heat storage;
   at least one solar collector;
   a heat transfer fluid that is liquid at ambient temperature;
   a heat exchanger for transfer of heat from the heat transfer fluid to the sensible heat storage,
   the station having a first mode of operation in which the station is configured so that heat is transferred from the heat transfer fluid to the sensible heat storage, and the temperature of the heat transfer fluid is
(a) above;
(b) at, or
(c) below but substantially at the saturation curve of the heat transfer fluid immediately after heat exchange with the sensible heat storage, and heat transfer fluid substantially in the vapour state is returned to the at least one solar collector.

2. The solar power station of claim 1 wherein in the first mode the station is configured so that the heat transfer fluid is superheated immediately after heat exchange with the sensible heat storage.

3. The solar power station claim 1 wherein in the first mode the station is configured so that the heat transfer fluid remains superheated between leaving the heat exchanger and returning to the at least one solar collector.

4. The solar power station of claim 1 including a pump subsystem configured to supply the heat transfer fluid to the at least one solar collector in either vapour or liquid form.

5. The solar power station of claim 4 wherein the pump subsystem includes a liquid pump and a vapour compressor.

6. The solar power station of claim 4 wherein the pump subsystem includes a steam separator.

7. The solar power station of claim 1 having a second mode of operation when the temperature and pressure of the heat transfer fluid at a first location is below a first set of thresholds and in which the station is configured so that heat is supplied to the heat transfer fluid but no heat exchange from the heat transfer fluid to the sensible heat storage occurs.

8. The solar power station of claim 7 wherein, in the second mode of operation, when the temperature and pressure of the heat transfer fluid at the first location is below the first set of thresholds, the station is configured so that heat is supplied to the heat transfer fluid but no heat exchange occurs between the heat transfer fluid and the sensible heat storage.

9. The solar power station of claim 7 wherein the sensible heat storage comprises at least one fluid sensible heat storage medium and in the second mode the station is configured so that the at least one fluid sensible heat storage medium does not flow through the heat exchanger.

10. The solar power station of claim 9 including a pump to pump the at least one fluid sensible heat storage medium through the heat exchanger and in the second mode the station is configured so that the pump is off.

11. The solar power station of claim 7 wherein in the second mode the station is configured so that the heat transfer fluid continues to pass through the heat exchanger.

12. The solar power station of claim 7 wherein in the second mode the station is configured so that the heat transfer fluid does not flow through the heat exchanger.

13. The solar power station of claim 12 wherein in the second mode the station is configured so that the heat transfer fluid bypasses the heat exchanger.

14. The solar power station of claim 7 including a heat source and in the second mode the station is configured so that the heat source selectively heats the heat transfer fluid.

15. The solar power station of claim 14 wherein the heat source includes at least one of the at least one solar collector.

16. The solar power station of claim 7 including a pump subsystem that is operable to supply the heat transfer fluid to the at least one solar collector in either vapour or liquid form and wherein in the second mode the pump subsystem is configured to supply vaporous heat transfer fluid to the at least one solar collector when the temperature and pressure of the heat transfer fluid are above a second set of thresholds, and is configured to supply liquid heat transfer fluid to the at least one solar collector when the temperature and pressure of the heat transfer fluid are below the second set of thresholds.

17. The solar power station of claim 16 wherein in the second mode the pump subsystem is configured to supply substantially only vaporous heat transfer fluid to the at least one solar collector when the temperature and pressure of the heat transfer fluid are above the second set of thresholds, and is configured to supply substantially only liquid heat transfer fluid to the at least one solar collector when the temperature and pressure of the heat transfer fluid are below the second set of thresholds.

18. The solar power station of claim 7 including a plurality of solar collectors and wherein in the second mode the station is configured so that the heat transfer fluid is circulated through less than all solar collectors.

19. The solar power station of claim 1 including:

a closed circuit interconnecting the at least one solar collector and the heat exchanger;

a reservoir for storage of heat transfer fluid separate from the circuit, and a transfer mechanism for selectively transferring heat transfer fluid between the circuit and the reservoir, whereby the mass of heat transfer fluid in the circuit is adjustable.

20. The solar power station of claim 19 wherein the reservoir stores heat transfer fluid in liquid form.

21. The solar power station of claim 19 including a pump subsystem configured to supply the heat transfer fluid to the at least one solar collector in either vapour or liquid form and wherein the pump subsystem includes a steam separator and the transfer mechanism is configured to transfer heat transfer fluid in vapour form from the steam separator to the reservoir and in liquid form from the reservoir to the steam separator.

22. The solar power station of claim 1 wherein the at least one solar collector comprises a plurality of dish solar collectors.

23. A method of operation of a solar power station having a sensible heat storage selectively heated by a heat transfer fluid that is liquid at ambient temperature, the heat transfer fluid being heated by at least one solar collector, the method including:

determining the temperature and pressure of the heat transfer fluid at a first location and:

(a) if the temperature and pressure of the heat transfer fluid is above a first set of thresholds, operating the station in a first mode in which the heat transfer fluid is heated by the at least one solar collector and heat is transferred from the heat transfer fluid to the sensible heat storage, and (b) if the temperature and pressure of the heat transfer fluid is below the first set of thresholds, operating the station in a second mode in which the heat transfer fluid is heated by the at least one solar collector whilst not transferring heat to the sensible heat storage, and wherein the first set of thresholds is selected so that in the first mode heat transfer fluid substantially in the vapour state is returned to the at least one solar collector, and wherein the first set of thresholds is selected so that in the first mode the heat transfer fluid is above, at or below but substantially at the saturation curve of the heat transfer fluid immediately after heat exchange with the sensible heat storage.

24. The method of claim 23 wherein the first set of thresholds is selected so that in the first mode the heat transfer fluid is a superheated vapour after transfer of heat to the sensible heat storage.

25. The method of claim 23 wherein the station includes a heat exchanger for transfer of heat from the heat transfer fluid to the sensible heat storage and the first mode includes passing the heat transfer fluid through the heat exchanger.

26. The method of claim 25 wherein the sensible heat storage comprises at least one fluid sensible heat storage medium and the first mode includes passing the at least one fluid sensible heat storage medium through the heat exchanger.

27. The method of claim 25 wherein the sensible heat storage comprises at least one fluid sensible heat storage medium and the second mode includes ceasing to pass the at least one fluid sensible heat storage medium through the heat exchanger.

28. The method of claim 25 wherein the second mode includes passing the heat transfer fluid through the heat exchanger.

29. The method of claim 25 wherein the second mode includes not passing the heat transfer fluid through the heat exchanger.

30. The method of claim 25 wherein, when operating in the second mode, determining:
 (c) if the temperature and pressure of heat transfer fluid is above a second set of thresholds and, if so, supplying the heat transfer fluid in substantially only vapour form to the at least one solar collector,
 and
 (d) if the temperature and pressure of heat transfer fluid is below the second set of thresholds but above a third set of thresholds and, if so, supplying the heat transfer fluid in substantially liquid form to the at least one solar collector,
 the solar power station including a steam separator and step (c) includes drawing vapour from the steam separator and step (d) includes drawing liquid from the steam separator.

31. The method of claim 23 wherein the second mode includes heating the heat transfer fluid by passing the heat transfer fluid through at least one solar collector.

32. The method of claim 23 wherein the quantity of heat transfer fluid being circulated is adjusted with energy input to the heat transfer fluid.

* * * * *